Figure 1:
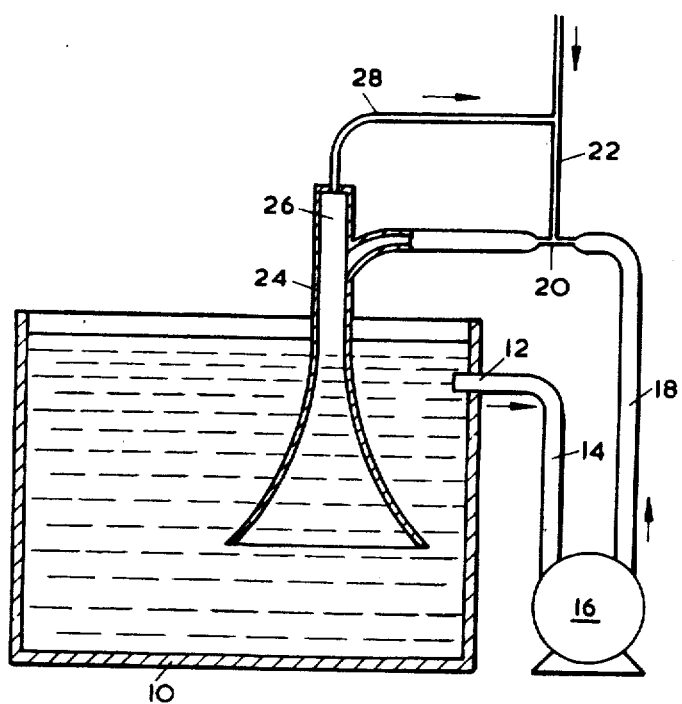

United States Patent [19]

Garrett

[11] 4,000,227
[45] Dec. 28, 1976

[54] DISSOLVING GAS IN LIQUID
[75] Inventor: Michael Ernest Garrett, Addlestone, England
[73] Assignee: BOC International Limited, London, England
[22] Filed: Sept. 24, 1974
[21] Appl. No.: 508,896
[30] Foreign Application Priority Data
Sept. 27, 1973 United Kingdom ............ 45283/73
[52] U.S. Cl. ................... 261/93; 210/219; 261/123; 261/DIG. 27; 261/DIG. 75
[51] Int. Cl.² ........................................ B01F 3/04
[58] Field of Search ........... 261/36 R, 87, 93, 123, 261/DIG. 75, 71, 4–7; 210/220, 219, 221 R, 197

[56] References Cited

UNITED STATES PATENTS

| | | | |
|---|---|---|---|
| 2,020,850 | 11/1935 | Myhren et al. | 261/DIG. 75 |
| 2,633,453 | 3/1953 | McAllister | 210/220 X |
| 3,162,702 | 12/1964 | Yonner | 261/123 |
| 3,210,053 | 10/1965 | Boester | 261/87 X |
| 3,271,304 | 9/1966 | Valdespino et al. | 261/DIG. 75 |
| 3,295,326 | 1/1967 | White | 261/36 R X |
| 3,439,807 | 4/1969 | Danjes | 261/93 X |
| 3,498,459 | 3/1970 | Bohnke | 261/93 X |
| 3,503,593 | 3/1970 | Nelson | 261/93 X |
| 3,539,158 | 11/1970 | Roos | 261/71 X |
| 3,643,403 | 2/1972 | Speece | 261/DIG. 75 |
| 3,799,511 | 3/1974 | Svantesson | 261/DIG. 75 |
| 3,804,255 | 4/1974 | Speece | 261/DIG. 75 |
| 3,867,488 | 2/1975 | Porterfield | 261/87 |

FOREIGN PATENTS OR APPLICATIONS

| | | | |
|---|---|---|---|
| 95,365 | 7/1922 | Switzerland | 261/DIG. 75 |
| 193,111 | 2/1923 | United Kingdom | 261/123 |
| 263,506 | 1/1927 | United Kingdom | 261/123 |

Primary Examiner—Tim R. Miles
Assistant Examiner—Richard L. Chiesa
Attorney, Agent, or Firm—Dennison, Dennison, Meserole & Pollack

[57] ABSTRACT

A soluble gas such as oxygen is dissolved in a liquid such as aqueous sewage liquors by introducing the gas into a stream of the liquid and passing the resultant stream downwards into a body of the liquid through a conduit of divergent cross-section in the direction of flow of the liquid.

19 Claims, 2 Drawing Figures

4,000,227

DISSOLVING GAS IN LIQUID

FIELD OF THE INVENTION

This invention relates to dissolving gas, for example an oxygen-containing gas, in liquid, for example water having an oxygen demand. It is particularly concerned with the problem of ensuring that a high proportion of gas introduced into a body of liquid does go into solution in the liquid.

DESCRIPTION OF THE PRIOR ART

Even if the introduction of gas into a body of liquid is accompanied by a high degree of agitation there is a tendency for the gas to rise to the liquid surface and to escape before it has had an opportunity to dissolve. Previous proposals have tended to overcome the problem by enclosing the whole region in which the dissolving is conducted and recovering any undissolved gas from the upper part of the region. When dealing with such processes as the introduction of oxygen into a sewage liquor the gas mixture that builds up in the upper part of the region is potentially hazardous in that oxygen may come into contact with gaseous hydrocarbons or with liquid hydrocarbons floating on the liquor surface. Moreover, the need to provide a gas-tight cover for the dissolving region makes for complications in establishing an adequate seal. The present invention relates to a system for dissolving gas in a liquid that seeks to dissolve substantially the whole of the gas in a single step.

SUMMARY OF THE INVENTION

According to the invention there is provided a method for dissolving gas in a liquid which comprises introducing the gas into a stream of the liquid and passing the thus-formed gas/liquid mixture substantially downwardly into a volume of liquid through a divergent conduit having at least its mouth located beneath the surface of the liquid volume.

The invention also provides apparatus for introducing gas into a liquid which includes a downward-facing divergent conduit with its mouth located beneath the surface of a volume of liquid and having at its upper end inlets for liquid and gas and means for inducing a downward flow of liquid through the conduit.

Because of the widening cross section of the conduit in a downstream direction the gas and liquid introduced at the upper end reduce in velocity as they pass downwards. This reduces the possibility of undissolved bubbles of gas being swept out of the end of the conduit. Instead the bubbles tend to rise within the conduit against the reduced velocity of the liquid stream. It is usually preferred to provide the liquid stream by withdrawing a portion of the liquid volume. It is preferred to raise the pressure of the liquid stream to a level in the range 0.5 – 50 psig before it contacts the gas. The gas/liquid mixture formed by the introduction of gas is then passed to the divergent conduit that leads to the liquid volume.

The preferred method of introducing gas is to pass a liquid stream through a venturi nozzle and allow the reduced pressure in the venturi to draw in gas from a gas line leading to the venturi.

In some instances it is advantageous to include one or more venturi sections downstream of a venturi into which the gas is introduced. Such further venturi sections assist in breaking the introduced gas into fine bubbles in the liquid stream, thereby increasing the surface area of contact between liquid and gas and thus improving the degree of dissolution.

The divergent conduit is preferably of a length and width that prevent the escape from the lower end of the conduit of any bubbles other than those small enough to dissolve before reaching the liquor surface. If desired a mechanical agitator can be included within the divergent conduit so as to promote dispersion of the gas in the liquid. The mechanical agitator can include porous blades as described and claimed in our UK patent application 57 468/73 for the introduction of the gas into the liquid.

The divergent conduit is preferably provided with a portion above the point of entry of the gas liquid mixture so as to permit the separation and collection of any bubbles that coalesce and rise upwards through the incoming gas/liquid stream. Preferably any gas recovered from this upper portion is recycled to the incoming stream of liquid.

A wide variety of shapes are possible for the divergent conduit. It can be of circular, rectangular or irregularly shaped cross section; it can be conical, can become more divergent with depth (trumpet-shaped) or less divergent with depth (bell-shaped). In some applications it will be desirable to provide one or more guards, typically wire mesh, to ensure that materials in the body of liquid do not enter the conduit.

We have also found that by providing a skirt around the circumference of the downstream end of the conduit any bubbles that are carried out of the end of the conduit rise into the skirt and collect therein. From the skirt the collected bubbles can be either returned to the other end of the conduit or, if desired, removed from the treatment vessel.

The skirt around the divergent conduit can extend upwards along the whole length of the conduit or alternatively the skirt need only pass along a portion of the vertical length of the conduit.

One reason for the effectiveness of a skirt in collecting residual bubbles is that the liquid stream leaving the lower end of the conduit undergoes a considerable reduction in downward velocity as it leaves the lower end of the conduit. Thus a downward velocity sufficient to carry entrained bubbles out of the end of the conduit is reduced to such an extent that it is insufficient to carry such entrained bubbles beyond the skirt.

In some instances it will be found convenient to immerse the whole of the divergent conduit in the volume of liquid to be treated. Indeed one of the appealing features of the invention is the possibility of providing a standard treatment unit to be immersed in a single vessel and thereby to provide a single tank treatment arrangement which in many instances can utilise an existing tank.

Particularly when used for treating sewage one or more baffles are preferably disposed in the treatment vessel below the outlet from the divergent conduit. This allows the region beneath the baffle or baffles to provide a relatively undisturbed solids settling region. One attractive form of baffle is a horizontal plate with a central orifice, the orifice having an adjustable cover to allow liquid to be directed to the lower layers if required.

If the divergent conduit is wholly immersed in a liquid it is similarly desirable to provide one or more baffles above the conduit. This permits a relatively undisturbed clarifying region to exist above the divergent conduit. The preferred shapes for an upper baffle are conical and dome - shaped. Such a shape prevents settling of solids on the upper surface of the upper baffle and provides a collector above the divergent conduit for any gas that escapes from the divergent conduit.

In some applications of the system gas bubbles that collect in the upper part of the conduit, in the skirt or in any other collector will have an undesirably high content of carbon dioxide or other gases and it will be found preferable to remove them rather than to recycle them.

Liquid flow within the divergent conduit can be induced by a variety of means. It can for example be provided by an impeller located within the upper part of the conduit or by introducing a fast moving stream of liquid in an appropriate direction at the upper end of the conduit. Flow in such an introduced stream can be provided either by a pump in the feed circuit or simply by gravity.

The process and apparatus of the invention are particularly suited to dissolving gases such as air, oxygen or nitrogen in water. Typical applications of the technique are the introduction of oxygenated water into a polluted stream or river, a sewage conduit, a tank containing sewage liquor or a tank containing fish.

If the particular circumstances so require, a body of liquid can be provided with two or more systems according to the invention. This is particularly advantageous for large tanks that would otherwise require an unduly large single unit. The system can be readily installed in an existing plant in order to enhance the dissolution of gas in the liquid body.

When using two or more divergent conduits it is in some instances convenient to pass gas through the divergent conduits in series. In such an arrangement the residence time of gas in the first divergent conduit is adjusted so that a substantial proportion of the gas does not dissolve but is collected and transferred to the next divergent conduit. By locating the divergent conduits at an increasingly high level in the treatment vessel a sufficient pressure difference can be achieved to convey the collected gas from one divergent conduit to the next. Alternatively the conduits can be at the same level, or even at successive lower levels, and the collected gas pumped from one to the next.

A combined assembly of divergent conduit, gas inlets, liquid inlets, baffles and skirts can be provided as a standard unit for immersion in a treatment tank. In one convenient arrangement all these members are suspended directly or indirectly from a horizontal plate which also acts as a lid for the treatment vessel.

The system offers the advantage that it avoids the presence of large volumes of enclosed gas above a liquid surface. Indeed the body of liquid can be housed in a completely open-topped tank. In some instances, such as fish farming, it may be desirable to provide some form of cover over the tank in order to exclude dirt and predators from the tank but even in such instances at least part of the cover can be open or porous.

Figure 2:
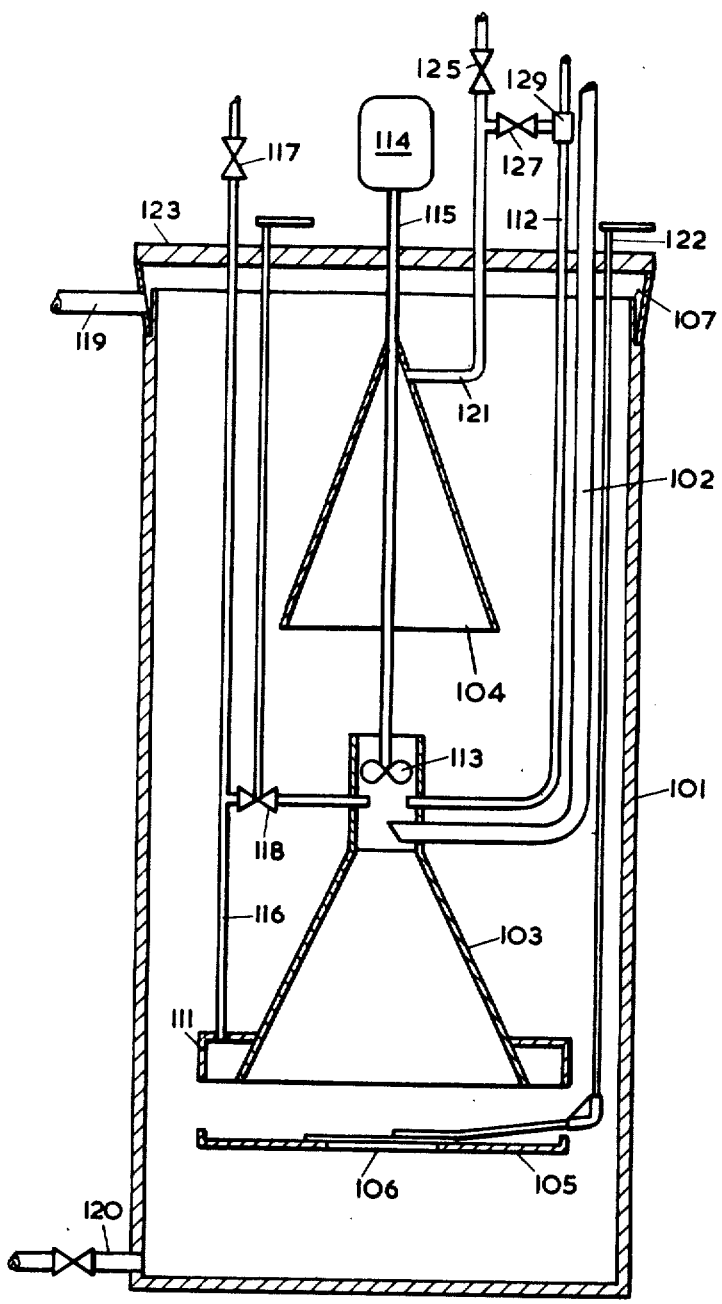

The invention is described below with reference to the accompanying figures in which:

FIG. 1 is a diagrammatic view, partly in section, of a treatment tank provided with one form of gas introduction system according to the invention, and FIG. 2 is a diagrammatic view, partly in section, of a second form of treatment tank also having a gas-introduction system according to the invention.

In the FIG. 1 apparatus an open-topped tank 10 of a type commonly used in treating sewage liquors, is provided with a water outlet 12 which leads through a conduit 14 to a water pump 16. The pump raises the pressure of the water to about 2.0 psig and expels it through a conduit 18 provided with a convergent/divergent venturi nozzle 20. A gas line 22 for the supply of oxygen also leads to the venturi 20. Downstream of the venturi 20 the conduit 18 leads to a vertically disposed divergent conduit 24. The conduit 24 is of a shape resembling that of a trumpet. At the point at which it meets the conduit 24 the conduit 18 is curved towards a downward direction so as to encourage the downward flow of liquor through the conduit 24.

At its upper end the conduit 24 is provided with a zone 26 to receive oxygen that rises upwards against the flow of liquor from the conduit 18. Any such oxygen can be recycled to the oxygen inlet conduit 22 so as to be given a further opportunity to dissolve in the liquid. It is found that the provision of such a recycle line 28 is particularly important in establishing the optimum economic condition.

The gas/liquid mixture reaching the conduit 24 is already in a turbulent state by virtue of having passed through the venturi and will consist of oxygen bubbles in suspension in the incoming water stream. As the velocity of the water stream falls on its downward passage through the conduit 24 the larger bubbles tend to come out of suspension and rise against the incoming flow. Medium sized bubbles tend to remain in the wider lower portion of the conduit 24 and thus prolong the period in which the gas contained in them remains in contact with the liquor in which it is to dissolve. The smallest bubbles remain in suspension in the incoming liquor stream but emerge from the mouth of the conduit 24 Suitable adjustment of the rate of operation of the pump 16 can be made to ensure that bubbles of a size too large to dissolve before they rise to the surface of liquor in the tank 10 do not escape from the mouth of conduit 24.

The FIG. 2 system includes a treatment vessel 101 containing sewage liquor introduced through an inlet conduit 102 into the upper part of a divergent conduit 103 in the lower part of the vessel 101 and coaxial therewith. A conical upper baffle 104 and horizontal lower baffle 105 are disposed at either end of the conduit 103 to provide a measure of control for liquid circulation within the vessel 101. The circulation is maintained by an impeller 113 in the uppermost part of the conduit 103. The impeller is driven by an electric motor 114 through a drive bar 115.

Oxygen-enriched gas is introduced through an inlet 112 into the upper part of the conduit 103 immediately below the impeller 113. A considerable degree of dispersion of oxygen-enriched gas thus occurs in the downward flowing liquid stream before it meets the effluent stream emerging from the inlet 102.

At its downstream end the conduit 103 is provided with an outer skirt 111 extending around its circumference. Any gas bubbles leaving the downstream end of the conduit 103 tend to collect in the skirt 111 from which they can be withdrawn through a conduit 116 and either vented through and outlet valve 117 or returned to the upper part of the conduit 103 through a valve inlet 118.

The upper level of liquor in the treatment vessel 101 is controlled by an outlet weir 107 with an outlet line 119. A valved outlet 120 is similarly provided at the base of the vessel to permit liquor, possibly together with suspended solids, to be removed.

The upper baffle 104 has a gas outlet line 121 from which gas can either be discarded through a valve 125 or recycled through a valved line 127 into the incoming gas stream in line 112 through a gas injector nozzle 129. The baffle 105 is provided with a variable aperture 106 to permit the flow of liquor to the lower level of the vessel 101 to be encouraged. The aperture opening is controlled by a rod mechanism 122 operated from the top of the vessel 101.

The vessel 101 is provided with a lid 123 which carries all the items located within the vessel 101 together with the control mechanisms needed to operate the internal valves. To assist understanding of the drawing, support rods from the lid 123 to the various members are not shown. The general arrangement is that vertical support rods from the lid 123 hold the upper baffle 104 and continue downwards to hold the divergent conduit 103 from which further rods project downwards to hold the lower baffle 105.

In operation the vessel 101 is first filled with sewage liquor through the inlet conduit 102. For rapid start-up an initial charge of activated sludge can be added at this stage. Circulation of liquor is induced by impeller 113 and oxygen-enriched gas is introduced through the inlet 112. The main treatment zone is thus the area enclosed within the divergent conduit 103. Because of the shape of the conduit oxygen-containing bubbles are retained therein and maintain a high level of oxygen concentration in the liquor. The baffles 104 and 105 ensure that the bulk of the circulation of liquor occurs within the region they enclose and thus provide a clarifying section above the baffle 104 and a settling section below the baffle 105. The clarifying action in the upper section allows a relatively clear liquor to be recovered through the outlet 119 and permits the heavy sludge and solids to settle on the base of the vessel 101 to be removed as required through the outlet 120. Gas trapped in the skirt 111 is either returned through the valve inlet to the conduit 103 or is discharged through the valve conduit 117.

The whole assembly attached to the lid 123 represents a convenient unit to be employed in a treatment vessel as required. In many applications this unit alone gives adequate treatment of a sewage liquor. It is also applicable as part of a system for treating a effluent which also requires other steps such as primary settling or subsequent liquor treatment.

We claim:

1. In a method for dissolving an oxygen-containing gas in a volume of liquid to be treated to maintain an aerobic condition within the material being treated comprising the steps of:
    a. introducing the gas into a stream of the liquid to produce an oxygenated stream,
    b. passing the oxygenated stream downwardly through a downwardly divergent conduit into the upper end of the conduit by at least means of an impeller located within an upper part of the conduit, which is located in a treatment tank having at least a central treatment zone; an upper clarifying zone and a lower settling zone and wherein the divergent conduit has at least an open lower outlet end within the treatment zone, the improvement comprising the steps of:
    c. baffling the outlet end of the conduit and with a horizontal baffle having a central orifice with an adjustable cover and positioned at a distance above the bottom of the treatment tank and below the said divergent conduit to define the lower settling zone,
    d. controlling flow of the oxygenated liquid and gas stream discharging from the divergent conduit to material which has settled into the settling zone by varying the central orifice by means located at least partially external of the treatment tank to maintain an aerobic condition within the settled material without unduly disturbing the settled material; and
    e. collecting the bubbles of gas that escape from the divergent conduit by utilization of a generally conical or dome shaped collector means located above the upper end of the divergent conduit and providing a recess below the surface of the volume of liquid in the tank, wherein the upper clarifying zone is maintained relatively undisturbed.

2. A method as claimed in claim 1 wherein the liquid stream is passed through a venturi nozzle and the reduced pressure in the venturi draws in oxygen-containing gas from a gas line leading to the venturi.

3. A method as claimed in claim 1 wherein the liquid stream is obtained by withdrawing a portion of the liquid volume.

4. A method as claimed in claim 1 wherein the pressure of the liquid stream is raised to a level in the range 0.5 to 50 psig before it contacts the gas.

5. A method as claimed in claim 1 wherein at least part of any gas recovered from the divergent conduit or from any collector associated therewith is recycled.

6. A method as claimed in claim 1 wherein the liquid is water containing waste material.

7. A method as claimed in claim 3 wherein the oxygen-containing gas has a proportion by volume of oxygen greater than that of air.

8. Apparatus for introducing gas into a volume of liquid which includes:
    a. a treatment tank for receiving the liquid and including at least a central treatment zone, an upper clarifying zone and a lower settling zone,
    b. a downwardly divergent conduit which is open at its upper inlet end and its lower outlet end, and is located in the central zone of the treatment tank whereby in use, the conduit is completely immersed in the volume of liquid in the tank,
    c. an impeller located within an upper part of the conduit to induce a downward flow of liquid through the conduit,
    d. means for introducing gas and liquid into the upper end of the conduit,
    e. a first baffle means spaced below the outlet end of the divergent conduit and above the bottom of the tank to define the lower settling zone, means associated with the said first baffle means for controlling the flow of the liquid and gas stream from the conduit to the settling zone without unduly disturbing material which has settled into the settling zone, said baffle means including a horizontal plate with a central orifice, said orifice being provided with an adjustable cover,
    f. said controlling means including means located at least partially external of said tank, and operably connected to said adjustable cover, for varying the central orifice, and
    g. at least a second baffle means disposed above the upper inlet end of the divergent conduit and at a distance below the surface of the volume of the liquid in the tank and which has a recess in its lower surface to collect any bubbles of gas that escape through the upper inlet end of the conduit, said second baffle means being conical or dome shaped to provide said recess, whereby said second baffle means defines the relatively undisturbed clarifying zone immediately beneath the surface of the volume of liquid in the tank.

9. Apparatus as claimed in claim 8 having a venturi nozzle at the upper end of the divergent conduit.

10. Apparatus as claimed in claim 8 in which the divergent conduit is of a length and width that prevents the escape from the lower end of the conduit of any bubbles other than those small enough to dissolve before reaching the liquor surface of the clarifying zone.

11. Apparatus as claimed in claim 8 wherein a mechanical agitator is included within the divergent conduit so as to promote dispersion of the gas in the liquid.

12. Apparatus as claimed in claim 11 wherein the agitator has one or more porous blades through which at least a part of the treatment gas can be introduced into the liquid.

13. Apparatus as claimed in claim 8 wherein the divergent conduit is provided with a portion above the point of entry of the gas/liquid mixture so as to permit the separation and collection of any gas that rises upwards through the incoming gas/liquid stream.

14. Apparatus as claimed in claim 8 wherein a skirt is provided around the circumference of the downstream end of the conduit to collect bubbles carried out of the end of the conduit.

15. Apparatus as claimed in claim 8 wherein the skirt around the divergent conduit extends upwards along the whole length of the conduit.

16. Apparatus as claimed in claim 8 wherein the impeller has one or more porous blades.

17. Apparatus as claimed in claim 8 wherein the divergent conduit is of circular cross-section.

18. Apparatus as claimed in claim 8 wherein the divergent conduit is of rectangular cross-section.

19. Apparatus as claimed in claim 8 wherein the divergent conduit is provided with at least one guard to ensure that solid materials in the body of liquid do not enter the conduit.

* * * * *